United States Patent

Shinya et al.

[11] Patent Number: 6,106,769
[45] Date of Patent: Aug. 22, 2000

[54] HYDROGEN STORAGE ALLOY COMPOSITION AND ELECTRODE USING SAID ALLOY COMPOSITION

[75] Inventors: Naofumi Shinya; Hiroto Sugahara, both of Fukui-ken, Japan

[73] Assignee: Shin-Etsu Chemical Co., Ltd., Tokyo, Japan

[21] Appl. No.: 08/961,493

[22] Filed: Oct. 30, 1997

[30] Foreign Application Priority Data

Oct. 31, 1996 [JP] Japan .................................. 8-304125
Oct. 31, 1996 [JP] Japan .................................. 8-304126

[51] Int. Cl.⁷ .......................... H01M 4/38; H01M 4/24; C22C 5/00
[52] U.S. Cl. ..................... 420/900; 420/416; 420/455; 429/59; 429/218; 429/223
[58] Field of Search .................... 420/900, 416, 420/455; 429/218, 223, 59

[56] References Cited

U.S. PATENT DOCUMENTS 4,459,341 7/1984 Marchant et al. .................. 429/33

FOREIGN PATENT DOCUMENTS 0607806 7/1984 European Pat. Off. .

OTHER PUBLICATIONS

Patent Abstracts of Japan, vol. 096, No. 007, Jul. 31, 1996 and JP 098 083623 A.
Patent Abstracts of Japan, vol. 012, No. 193, Jun. 4, 1988 and JP 62 296365 A.
European Search Report. for application EP97 30 8723, Feb. 16, 1998.

Primary Examiner—Sikyin Ip
Attorney, Agent, or Firm—Millen, White, Zelano & Branigan, P.C.

[57] ABSTRACT

A hydrogen absorbing alloy composition for a nickel-hydrogen secondary battery which includes $LnNi_5$ hydrogen absorbing alloy, where Ln represents at least one rare-earth element. The hydrogen absorbing alloy composition also includes at least one compound selected from the group consisting of heavy rare-earth oxides, heavy rare-earth hydroxides, compound oxides including at least one rare-earth element and compound hydroxides including at least one rare-earth element. Rare-earth elements can be selected from the group consisting of La, Ce, Pr, Nd, Sm, Eu, Gd, Tb, Dy, Ho, Er, Tm, Yb and Lu. Exemplary hydrogen absorbing alloy compositions include La alone or in combination with one other rare-earth element, such as Ce, Pr, Nd, or Sm. Exemplary rare-earth oxides include $Yb_2O_3$, $Er_2O_3$ and $GdO_3$ and exemplary rare-earth hydroxides include $Yb(OH)_3$ and $Er(OH)_3$.

20 Claims, 2 Drawing Sheets

HYDROGEN STORAGE ALLOY COMPOSITION AND ELECTRODE USING SAID ALLOY COMPOSITION

FIELD OF THE INVENTION

The present invention relates to a hydrogen storage alloy composition and, more particularly, to a hydrogen storage alloy composition which has a high capacity and a long life upon repetition of alternate absorption and desorption of hydrogen and is therefore used suitably in the hydrogen absorbing alloy-utilized field, e.g., for a hydrogen storage tank and a negative electrode of a nickel-hydrogen battery, and further to a hydrogen absorbing alloy electrode for a nickel-hydrogen storage battery.

BACKGROUND OF THE INVENTION

Since alloys capable of absorbing and desorbing hydrogen, or hydrogen storage alloys, were discovered, they have been applied to not only a hydrogen storage means but also a battery and the like. In particular, the hydrogen absorbing alloys developed with the intention of using them for a hydrogen car, an air conditioner and so on have undergone various improvements in recent years.

More specifically, a $LaNi_5$ alloy which is first examined as a hydrogen absorbing alloy (See Japanese Tokkai Sho 51-13934, wherein the term "Tokkai" as used herein means an "unexamined published patent application") has the advantage of a high hydrogen storage capacity, but it suffers from disadvantages that not only La metal is expensive but also it is pulverized easily by repeating the absorption and desorption of hydrogen alternately and apt to be corroded by an alkaline or acidic solution.

Accordingly, when it is used as the electrode of an alkaline secondary battery, such an alloy can ensure a high initial electric capacity in the secondary battery. However, the electric capacity of the secondary battery is reduced to one-half or below by the charge-and-discharge cycles repeated about 50 times. Thus, such a secondary battery cannot stand a long use.

The aforementioned drawbacks of the $LaNi_5$ alloy are mitigated by replacing a part of the La element by another rare earth element, such as Ce, Pr or Nd, and/or a part of the Ni element by another metal element such as Co, Al or Mn (See, e.g., Japanese Tokkai Sho 53-4918, Sho 54-64014, Sho 60-250558, Sho 61-91862 and Sho 61-233969).

The $LaNi_5$ alloys modified as described above (hereinafter referred to as "$LaNi_5$ type hydrogen absorbing alloys"), though they are somewhat inferior to the $LaNi_5$ alloy in hydrogen storage capacity, have an advantage over the $LaNi_5$ alloy in being improved in corrosion resistance to an alkaline or acidic solution. When they are each used for the negative electrode of an alkaline secondary battery, they can therefore lengthen the charge-and-discharge cycle life of the alkaline secondary battery. However, such a prolonged cycle life of the alkaline secondary battery, which is obtained by the use of the foregoing $LaNi_5$ type hydrogen absorbing alloys, is still insufficient, and the electric capacity per unit weight is also unsatisfactory.

High capacity (or high electric capacity per unit weight) and long lifetime are the characteristics generally required for a battery. Thus, reduction in the reserve quantity of an electrode becomes necessary for the production of a secondary battery having a high capacity by the use of a $LaNi_5$ type hydrogen absorbing alloy. Although the capacity of a battery can be elevated by the reduction of the reserve quantity, it is attended by a problem of shortening the cycle life. This problem is not yet solved.

When the secondary battery is overcharged, the oxygen gas generated from the positive electrode promotes the oxidation of a hydrogen absorbing alloy, and thereby the charge acceptance of the hydrogen absorbing alloy is lowered. As a consequence of the foregoing, hydrogen gas comes to be produced upon charging, and the hydrogen gas produced raises the internal pressure of the closed secondary battery to actuate a pressure valve, thereby causing a loss of the electrolytic solution. Thus, the internal resistance of the battery is increased; as a result, the discharge capacity is lowered as the charge-and-discharge cycle is repeated.

For the purpose of removing the foregoing drawback, the method of etching the hydrogen absorbing alloy with an acidic or alkaline solution and the method of plating the hydrogen absorbing alloy with copper or nickel have been proposed.

However, those methods are unsuccessful in the prevention of corrosion at the active surfaces attributable to cracks the hydrogen absorbing alloy newly has in it upon repetition of alternate charge and discharge, so that they cannot inhibit the alloy to lower its hydrogen storage capacity. Thus, it is difficult for those methods also to ensure a sufficiently long charge-and-discharge cycle life in the electrode.

With the intention of obviating the foregoing defect, the method of lengthening the charge-and-discharge cycle life of a battery has been proposed (Japanese Tokkai Hei 6-215765), wherein yttrium and/or a yttrium compound (inclusively referred to as "yttrium" hereinafter) is incorporated in a hydrogen absorbing alloy electrode; as a result, the yttrium is dissolved in an alkali electrolyte and deposited on active surfaces which are newly formed in the hydrogen absorbing alloy due to the generation of cracks, and the yttrium cover thus formed on the active surface inhibits the hydrogen absorbing alloy from undergoing oxidation to prevent the lowering of the hydrogen storage capacity. In addition, the method of incorporating a light rare-earth oxide in a hydrogen absorbing alloy in place of the foregoing yttrium compound has been proposed (Japanese Tokkai Hei 8-222210). However, the former method (Japanese Tokkai Hei 6-215765) is attended by deterioration in the initial activity, while the latter method (Japanese Tokkai Hei 8-222210) has a defect of being ineffective for hydrogen absorbing alloys other than those having laves phases with respect to the charge-and-discharge cycle life and the high temperature storage characteristics.

SUMMARY OF THE INVENTION

As a result of our intensive studies of the aforementioned problems, it has been found that, when at least either a heavy rare-earth oxide or a heavy rare-earth hydroxide, or at least either a compound oxide comprising at least one rare earth element or a compound hydroxide comprising at least one rare earth element is incorporated in a hydrogen absorbing alloy electrode, not only the foregoing defect can be removed but also the charge-and-discharge cycle life can be prolonged to a satisfactory extent, thereby achieving the present invention.

Therefore, a first object of the present invention is to provide a hydrogen absorbing alloy composition suitable for a negative electrode of a high-performance nickel-hydrogen secondary battery.

A second object of the present invention is to provide a hydrogen absorbing alloy electrode for a nickel-hydrogen secondary battery which has a high capacity and a long charge-and-discharge cycle life but also improved initial activity and corrosion resistance.

The above-described objects of the present invention are attained with a hydrogen absorbing alloy composition which comprises;
(1) 100 parts by weight of a $LnNi_5$ hydrogen absorbing alloy, wherein Ln represents at least one rare earth element, and
(2) 0.2 to 20 parts by weight of at least one compound selected from the group consisting of heavy rare-earth oxides, heavy rare-earth hydroxides (the term "heavy rare-earth" is defined hereinafter), compound oxides comprising at least one rare earth element and compound hydroxides comprising at least one rare earth element:
and a hydrogen absorbing alloy electrode for a nickel-hydrogen secondary battery, wherein the aforesaid composition and a conductive support are used.

DETAILED DESCRIPTION OF THE INVENTION

Figure 1:
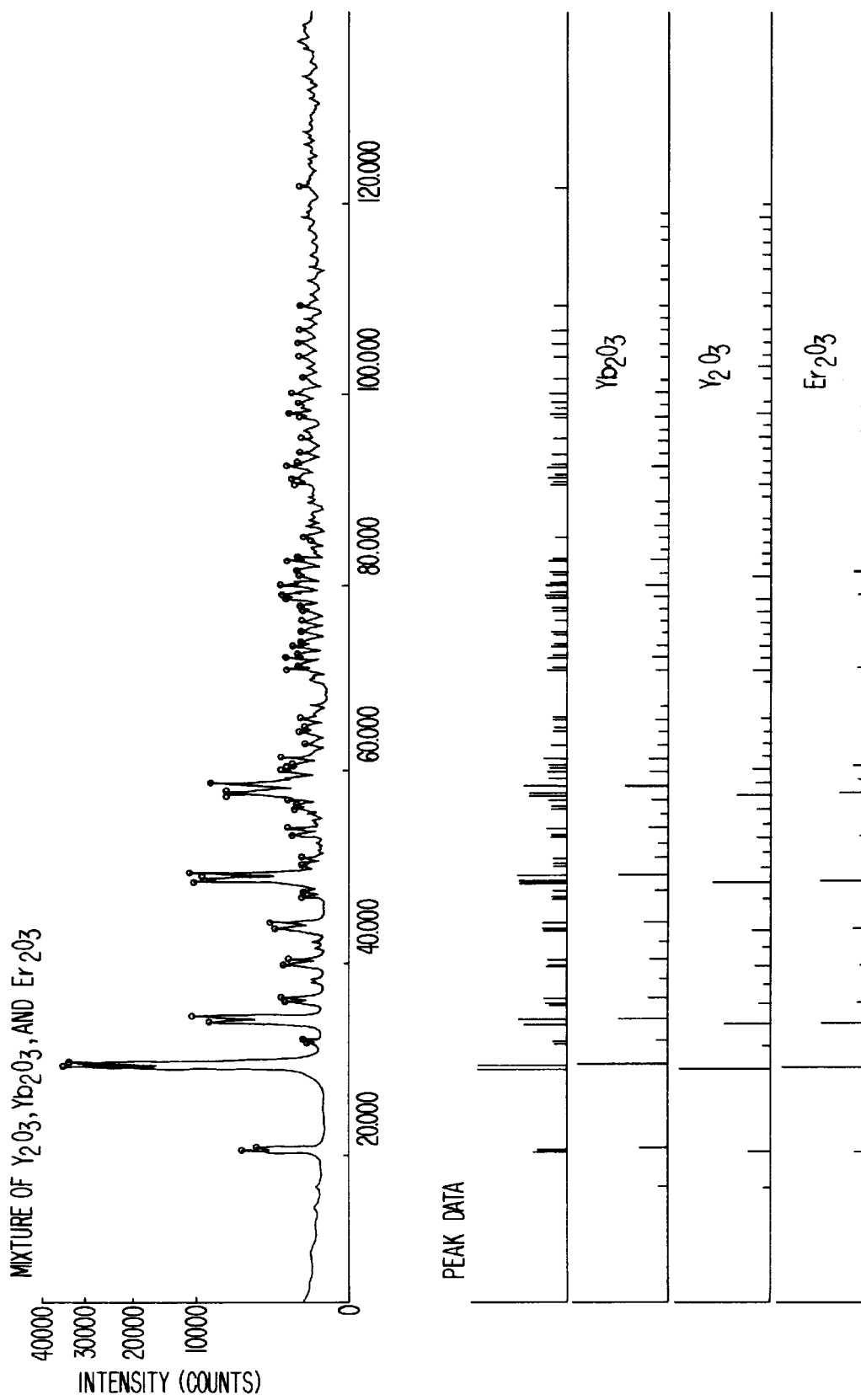
FIG. 1 shows the x-ray diffraction spectrum of a mixture of $Yb_2O_3$, $Y_2O_3$ and $Er_2O_3$ powders, which is one example of rare-earth oxide mixtures, and the peak assignment thereof.

The Ln in the rare-earth alloy represented by formula $LnNi_5$, which is used as the component (1) in the present invention, includes at least one rare earth element, and has no particular restriction as to constituent elements thereof. More specifically, any of rare earth elements known to be usable for hydrogen absorbing alloys can be employed as Ln.

Examples of a rare earth element which can be suitably used in the present invention include La, Ce, Pr, Nd, Sm, Eu, Gd, Tb, Dy, Ho, Er, Tm, Yb and Lu.

In particular, it is advantageous to mainly use La as the Ln and further use Ce, Pr, Nd or/and Sm in combination with La.

The $LaNi_5$ type hydrogen absorbing alloys which can used as the component (1) in the present invention, are represented by $LaNi_5$ in terms of stoichiometric ratio. Preferably, such a $LaNi_5$ type hydrogen absorbing alloy is an intermetallic compound prepared by replacing a part of La by another rare earth element, such as Ce, Pr or Nd and further replacing a part of Ni by other metals, such as Co, Mn, Al, Fe and/or Cu. From the viewpoint of achieving a satisfactory cycle life, it is desirable to replace a part of Ni by at least Mn, preferably Mn and Al, more preferably Mn, Al and Co.

More specifically, such $LaNi_5$ type hydrogen absorbing alloys, which are favorably used in the present invention, are represented by $Ln(Ni(w-x-y-z)Mn_xAl_yCo_z)$, wherein Ln is La alone or a mixture of La and another rare earth element, preferably Ce, Pr, Nd, Sm or a mixture thereof, and w, x, y and z are in the following ranges respectively; $4.8 \leq w \leq 5.3$, $0 < x \leq 0.6$, $0 < y \leq 0.5$, and $0 < z \leq 1.0$.

As an example of such intermetallic compounds, mention may be made of the $LaNi_5$ type alloy in which 20 weight % of La is replaced by Ce, 14 atomic % of Ni is replaced by Co, 4 atomic % of Ni is replaced by Mn and 6 atomic % of Ni is replaced by Al. When the values of w, x, y and z are out of the foregoing ranges, the hydrogen absorbing-and-desorbing cycle life is shortened and the hydrogen storage capacity is decreased in some cases.

Further, it is desirable for the hydrogen absorbing alloy used in the present invention to have an average grain diameter (D) of from 1 to 300µ.

The heavy rare-earth oxide and the heavy rare-earth hydroxide, which each or both can be used as the component (2), are represented by $R^1_2O_3$ and $R^1(OH)_3$ respectively, wherein $R^1$ is a heavy rare-earth element. The term "heavy rare-earth element" used herein is intended to include Eu, Gd, Tb, Dy, Ho, Er, Tm, Yb and Lu.

With respect to such oxides and hydroxides, it is desirable that $R^1$ be Yb, Er, Dy, Gd or Ho. In particular, ytterbium oxide ($Yb_2O_3$), ytterbium hydroxide ($Yb(OH)_3$), erbium oxide ($Er_2O_3$) and erbium hydroxide ($Er(OH)_3$) are preferred over the others.

When the heavy rare-earth oxide as described above is added to a hydrogen absorbing alloy, it is desirable that the specific surface area thereof be from 0.1 to 10 $m^2/g$, preferably from 0.2 to 5.0 $m^2/g$, determined by BET method. When the specific surface area of the oxide used is in the aforesaid range, the resultant alloy can have an improved alkali resistance.

When the heavy rare-earth hydroxide as described above is added to a hydrogen absorbing alloy, it is desirable for the rare-earth metal present therein to have a purity of at least 30 wt %, preferably from 30 to 80 wt %, from the viewpoint of the reactivity with the hydrogen absorbing alloy.

Besides the foregoing heavy rare-earth oxides and hydroxides, the compound oxides and the compound hydroxides which each comprise the combination of at least two different rare earth elements can be used as the component (2) of the present composition.

Such a compound oxide (compound hydroxide) is not a simple mixture of oxides (hydroxides) but a solid solution of oxides (hydroxides). And it can be produced, e.g., in the following manner: Starting materials (which includes at least one rare-earth compound) for the desired compound oxide or compound hydroxide are mixed in respectively intended amounts, and dissolved in a water solution of nitric acid (or hydrochloric acid, sulfuric acid, hydrofluoric acid or the like). The resultant solution is admixed with oxalic acid (or an oxalate, such as potassium oxalate, sodium oxalate or ammonium oxalate, a carbonate, such as $K_2CO_3$, $(NH_4)_2CO_3$ or $Na_2CO_3$, or an alkali, such as KOH, $NH_4OH$ or NaOH) with stirring, thereby causing coprecipitation. The coprecipitated product was filtered off, rinsed with water, and then sintered at about 800°–1,100° C. (in the atmosphere).

Figure 2:
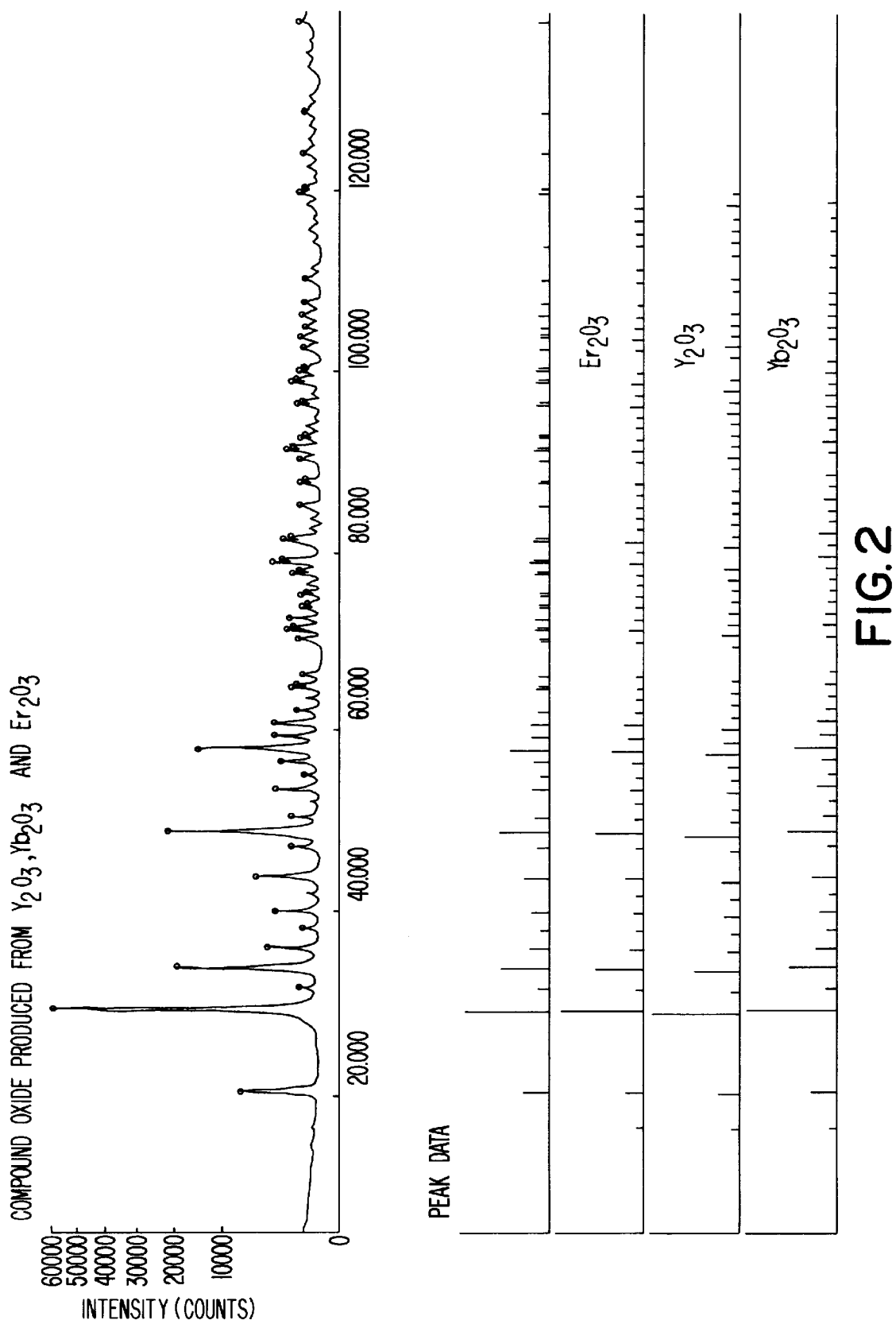
FIG. 2 shows the X-ray diffraction spectrum of a compound oxide powder produced from $Yb_2O_3$, $Y_2O_3$ and $Er_2O_3$, which is one example of compound oxides according to the present invention, and the peak assignment thereof.

The production of a compound oxide (compoound hydroxide), or a solid solution, can be confirmed by X-ray powder method. More specifically, each of the compound oxides (compound hydroxides) used in the present invention, which comprises at least two different metals including at least one rare earth metal, shows a diffraction spectral pattern having no split in peaks (as shown in FIG. 2), while the diffraction spectral pattern of the mixture comparable thereto has split in each peak (as shown in FIG. 1); thereby confirming that each compound oxide (compound hydroxide) has its own crystal structure.

The rare earth elements comprised in each of the compound oxides and each of the compound hydroxides, which can be used as the component (2) of the present composition, can be any of the combination of two or more rare earth elements selected from the group consisting of La, Ce, Pr, Nd, Y, Sm, Eu, Gd, Tb, Dy, Ho, Er, Tm, Yb and Lu.

Examples of a compound oxide which can be used include the combinations of at least two different oxides selected from the group consisting of $Y_2O_3$, $Yb_2O_3$, $La_2O_3$, $Ce_2O_3$, $Nd_2O_3$, $Pr_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$ and $Lu_2O_3$. Such a compound oxide is represented by $(R^2{}_2O_3)_a \cdot (R^3{}_2O_3)_b$, $(R^2{}_2O_3)_c \cdot (R^3{}_2O_3)_d \cdot (R^4{}_2O_3)_e$ or the like, wherein $R^2$, $R^3$ and $R^4$ are different from one another and each represents a rare earth element selected from the above-recited ones, a and b are each from 0.1 to 0.9 by mole, preferably from 0.2 to 0.8 by mole, provided that a+b is 1 by mole, and c, d and e are each from 0.1 to 0.8 by mole, provided that c+d+e is 1 by mole.

Examples of a compound hydroxide which can be used include the combinations of at least two different hydroxides selected from the group consisting of $Y(OH)_3$, $Yb(OH)_3$, $La(OH)_3$, $Ce(OH)_3$, $Nd(OH)_3$, $Pr(OH)_3$, $Sm(OH)_3$, $EU(OH)_3$, $Gd(OH)_3$, $Tb(OH)_3$, $Dy(OH)_3$, $Ho(OH)_3$, $Er(OH)_3$, $Tm(OH)_3$ and $Lu(OH)_3$. Such a compound hydroxide is represented by $(R^2(OH)_3)_a \cdot (R^3(OH)_3)_b$, $(R^2(OH)_3)_c \cdot (R^3(OH)_3)_d \cdot (R^4(OH)_3)_e$ or the like, wherein $R^2$, $R^3$ and $R^4$ are different from one another and each represents a rare earth element selected from the above-recited ones, a and b are each from 0.1 to 0.9 by mole, provided that a+b is 1 by mole, and c, d and e are each from 0.1 to 0.8 by mole, provided that c+d+e is 1 by mole.

When a compound oxide or a compound hydroxide is produced using the combination of at least 4 different oxides or hydroxides, it is required that the amount of each oxide or hydroxide used be at least 10 mole % and the total amount of oxides or hydroxides used be 100 mole %.

Examples of a compound oxide and a compound hydroxide which can be advantageously used in the present invention include the compound oxides produced using $Yb_2O_3$ and $Lu_2O_3$ in combination, those produced uing $Yb_2O_3$ and $Er_2O_3$ in combination, those produced using $Er_2O_3$ and $DY_2O_3$ in combination, those produced using $Yb_2O_3$, $SM_2O_3$ and $Gd_2O_3$ in combination, those produced using $Y_2O_3$, $Er_2O_3$ and $Yb_2O_3$ in combination, the compound hydroxides produced using $Yb(OH)_3$ and $Er(OH)_3$ in combination, and those produced using $Er(OH)_3$ and $Dy(OH)_3$ in combination.

Besides the combination of two or more rare earth elements, the combination of at least one rare earth element and at least one metal element except rare earth elements, such as Co, Ni, Zr, Hf, Al, V and Nb, can also be comprised in the compound oxides or the compound hydroxides used as the component (2) in the present invention.

Such compound oxides which can be used are represented by formula $R^5MO_m$, wherein $R^5$ is a rare earth element such as Eu, Gd, Tb, Dy, Ho, Er, Tm, Yb, Lu or Y, M is a metal element except rare earth elements and m is a number of 2 to 6, with examples including $Dy_2Hf_2O_7$, $Eu_2Hf_2O_7$, $Yb_2Zr_2O_7$, $Er_2Zr_2O_7$, $YAlO_4$, $YNbO_4$, $YVO_4$ and $ErAlO_3$.

The hydrogen absorbing alloy composition of the present invention is required to comprise 100 parts by weight of the component (1) and 0.2–20 parts by weight of the component (2). When the amount of component (2) added is less than 0.2 parts by weight, the hydrogen absorbing alloy obtained cannot have sufficient improvements in corrosion resistance and hydrogen absorbing-and-desorbing cycle life characteristics; while, when it is increased beyond 20 parts by weight, the hydrogen absorbing alloy obtained suffers deterioration in contact characteristics (including heat conductivity and electric conductivity) and the production cost thereof becomes high. Preferably, the amount of the component (2) added is from 0.5 to 5 parts by weight per 100 parts by weight of the component (1).

In particular, the compound oxides whose metallic constituents are rare earth elements alone are preferred as the component (2).

The aforementioned components (1) and (2) are each ground to a powder with a ball mill, a jet mill, a pulverizer or the like, and then mixed together with conventional stirring and mixing means to obtain a powdery composition. Therein, it is desirable that the average grain diameter of the component (2) be from 1 to 300 μm, preferably from 10 to 100 μm. The thus obtained hydrogen absorbing alloy composition has a high hydrogen storage capacity, a long hydrogen absorbing-and-desorbing cycle life and a high corrosion resistance.

The hydrogen absorbing alloy composition of the present invention can be obtained by adding an organic binder as described below to the foregoing powdery composition.

The electrode of the present invention can be prepared as follows: The powdery composition prepared above is added to an aqueous binder solution, and kneaded to make a paste. The paste obtained is filled into a three-dimensional conductive support, such as textile Ni or foamed Ni, or a two-dimensional conductive support such as a punching metal, and then pressed to form a negative electrode for a nickel-hydrogen secondary battery.

The organic binder used for binding the foregoing hydrogen absorbing alloy composition can be properly selected from the binders used for conventional hydrogen absorbing alloy electrodes.

Examples of such a binder include celluloses such as methyl cellulose and carboxymethyl cellulose, polyvinyl alcohol, polyethylene oxide, polytetrafluoroethylene and high-molecular latexes. These binders can be used alone or as a mixture of two or more thereof.

The amount of the organic binder used is from 0.1 to 20 parts by weight, preferably from 0.1 to 6 parts by weight, per 100 parts by weight of a hydrogen absorbing alloy. When the amount of a binder used is increased beyond 20 parts by weight, the activity becomes poor and the capacity (maximum capacity) is lowered; while, when it is less than 0.1 parts by weight, the cycle life is shortened and the resultant alloy comes off the support.

In the hydrogen absorbing alloy electrode according to the present invention, the rare-earth metal(s) or compound(s) contained in a $LaNi_5$ type hydrogen absorbing alloy layer is(are) dissolved in an alkali electrolyte, and deposited on active surfaces which are newly formed in the hydrogen absorbing alloy layer due to the cracks generated during charge-and discharge cycles. The cover of rare-earth element(s) thus formed on the active surface inhibits the hydrogen absorbing alloy surface from undergoing oxidation to ensure a high capacity, a long charge-and-discharge cycle life and an improved initial activity in the electrode. Therefore, the electrode of the present invention is well suited for a nickel-hydrogen secondary battery.

The present invention will now be illustrated in greater detail by reference to the following examples. However, the invention should not be construed as being limited to these examples.

EXAMPLE 1

The La—Ce alloy having the La content of 80 weight % and the Ce content of 20 weight %, Ni, Co, Mn and Al were weighed out in their respective amounts such that the atomic ratio of La—Ce to Ni to Co to Mn to Al was 1.00:3.80:0.70:0.20:0.30 (B/A=5.0), and molten with a high-frequency furnace, followed by cooling. Thus, a LaNi$_5$ type alloy was prepared. This alloy was subjected to a heat treatment at 1000–1100° C. for 5 hours in the argon atmosphere, and ground mechanically so that the powder obtained had an average grain diameter of 40–50 μm or below.

To 16 g of the thus obtained alloy powder, ytterbium oxide having a specific surface area of 2.2 m$^2$ was added in an amount of 2 weight %, and further 4 g of a 3 % solution of polyvinyl alcohol (average degree of polymerization: 2,000; saponification degree: 98 mole %) was added to prepare a paste.

The paste prepared above was filled homogeneously into a foam nickel having a porosity of 95 %, and pressed into a sheet-form hydrogen absorbing alloy having a thickness of 0.5–1.0 mm. To the surface of the sheet-form alloy obtained, a lead line was attached to make a negative electrode.

Additionally, a known foam metal nickel having the capacity of 2,400 milliampere-hour (hereinafter referred to as "mAh") was used as positive electrode.

Then, a separator made of a nonwoven fabric of polypropylene, which was rendered hydrophilic by conventional treatments, was put between the sheet-form negative and positive electrodes prepared above were wound into a roll, and packed into a cylindrical container. Further, an aqueous KOH solution having a concentration of 6 moles per liter was poured as an electrolytic solution into the container. Then, the container was sealed, thereby making a SC-size closed-type nickel-hydrogen (alkaline) secondary battery having a nominal capacity of 2,400 mAh.

Under the temperature regulated at 20° C., the thus made battery was charged for 4 hours by sending thereto an electric current of 720 milliampere (mA) and then made to discharge an electric current of 480 mA until the battery voltage was decreased to 1.0 V. This charge-and-discharge cycle operation was repeated at 20° C. During the repeated operations, the number of cycles repeated till the capacity was dropped to 60 % of the initial capacity was determined, and thereby the charge-and-discharge cycle life at 20° C. was evaluated. In addition, the internal pressure in the battery was measured after the charge-and-discharge cycle operation was repeated 10 times.

Further, a negative electrode-regulated open-type nickel-hydrogen secondary battery was made using the negative electrode (3×4 cm$^2$) prepared above, a conventional positive electrode made of sintered Ni and the same separator and electrolytic solution as used for making the foregoing closed-type battery, and the initial capacity (the capacity at the tenth cycle) thereof was measured as follows:

The battery was charged for 5 hours at a charging rate of 0.3 Coulomb (C) under a temperature regulated at 20° C., and then discharged at a discharging rate of 0.2 C under a temperature regulated at 20° C. till the battery voltage was dropped to 0.8 V. This charge-and-discharge cycle was repeated 10 times. The initial capacity was evaluated by the capacity measured at the tenth cycle.

The results obtained are shown in Table 1.

EXAMPLES 2 AND 3

Alloy compositions were prepared in the same manner as in Example 1, except that Er$_2$O$_3$ and Gd$_2$O$_3$ were each used in place of Yb$_2$O$_3$, and evaluated by the same method as adopted in Example 1. The results obtained are also shown in Table 1.

EXAMPLES 4 AND 5

Alloy compositions were prepared in the same manner as in Example 1, except that the hydroxides, Yb(OH)$_3$ and Er(OH)$_3$, were each used in place of the oxide Yb$_2$O$_3$, and evaluated by the same method as adopted in Example 1. Additionally, the ytterbium hydroxide used had a ytterbium purity of 35.3 %. The results obtained are also shown in Table 1.

EXAMPLE 6

The La—Ce alloy having the La content of 80 weight % and the Ce content of 20 weight %, Ni, Co, Mn and Al were weighed out in their respective amounts such that the atomic ratio of La—Ce to Ni to Co to Mn to Al was 1.00:3.90:0.70:0.20:0.30 (B/A=5.1), and molten with a high-frequency furnace, followed by cooling. Thus, a LaNi$_5$ type alloy was prepared. This alloy was subjected to a heat treatment at 1,000–1,100° C. for 5 hours in the argon atmosphere, and ground mechanically so that the powder obtained had an average grain diameter of 40 μm or below.

To 16 g of the thus obtained alloy powder, a compound oxide produced in the manner described below was added in an amount of 3 weight %, and further 4 g of a 3 % polyvinyl alcohol solution was added to prepare a paste. The compound oxide used was produced as follows: Ytterbium oxide and lutetium oxide are mixed in a ratio of 1:1 by weight, dissolved in a nitric acid solution, admixed with oxalic acid with stirring to cause coprecipitation, filtered off, rinsed with water, and then sintered at about 900° C. in the atmosphere.

The thus prepared alloy composition was evaluated by the same method as adopted in Example 1. The results obtained are also shown in Table 1.

EXAMPLES 7 AND 15

Other five compound oxides were produced using two or three different rare-earth oxides in the ratios shown in Table 1 respectively.

Alloy compositions were prepared in the same manner as in Example 6, except that those compound oxides were each used in place of the compound oxide used in Example 6, and evaluated by the same method as adopted in Example 1. The results obtained are also shown in Table 1.

EXAMPLES 16 AND 18

Compound hydroxides were produced using two different rare-earth hydroxides in the ratios (by weight) shown in Table 1 respectively.

Alloy compositions were prepared in the same manner as in Example 6, except that those compound hydroxides were each used in place of the compound oxide used in Example 6, and evaluated by the same method as adopted in Example 1. The results obtained are also shown in Table 1.

COMPARATIVE EXAMPLES 1 TO 4

Alloy compositions were prepared in the same manner as in Example 1, except that La$_2$O$_3$ was added in place of Yb$_2$O$_3$ (Comparative Example 1) and the amounts of Yb$_2$O$_3$ added were 0, 0.05 weight % and 30.0 weight % (Comparative Examples 2, 3 and 4) respectively. The evaluation of these compositions were made using the same method as adopted in Example 1. The results obtained in Comparative Examples 1 and 2 are shown in Table 1, and those in Comparative Examples 3 and 4 are shown in Table 3.

EXAMPLES 19 TO 23 AND COMPARATIVE EXAMPLE 5

The La—Ce alloy having the La content of 60 weight % and the Ce content of 40 weight %, Ni, Co, Mn and Al were weighed out in their respective amounts such that the atomic ratio of La—Ce to Ni to Co to Mn to Al was 1.00:3.70:0.70:0.20:0.30 (B/A=4.9), and molten with a high-frequency furnace, followed by cooling. Thus, a $LaNi_5$ type alloy was prepared. This alloy was subjected to a heat treatment at 1000–1100° C. for 5 hours in the argon atmosphere, and ground mechanically so that the powder obtained had an average grain diameter of 40–50 μm or below.

To 16 g of the thus obtained alloy powder, a ytterbium oxide having a specific surface area of $m^2$ (Example 19), 5.5 $m^2$ (Example 21), or 13.5 $m^2$ (Example 22), or a ytterbium hydroxide wherein the purity of ytterbium contained was 35.3 % (Example 20) or 21.3 % (Example 23) was added in an amount of 2 weight %.

The thus prepared hydrogen absorbing alloy compositions and the hydrogen absorbing alloy composition prepared in the same manner as in Example 19, except that neither rare-earth oxide nor rare-earth hydroxide was added to the alloy (Comparative Example 5), were each immersed in an aqueous KOH solution having a concentration of 6 mol/l for 72 hours at 80° C., and then subjected successively to filtration, rinsing and drying operations. The quantity of acicular rare-earth hydroxide produced on the thus treated alloy surface (corrosion quantity) was determined by X-ray powder method, and thereby the corrosion resistance of each alloy composition was evaluated.

More specifically, a drop of silicone oil was added to a 0.2 g portion of each sample and kneaded thoroughly. It was added little by little to the filling part of a glass sample plate (depth :0.2 mm), and pressed with a cover glass for leveling. The thus prepared sample plate was subjected to X-ray diffraction analysis. Therein, the measurement was performed using 50 kV–200 mA X-ray under a condition that X-ray diffraction angle was changed from 37.50 to 41.50 by stepwise scanning with a step gap of 0.04° and the counting time was 30 seconds. The thus measured (201) diffraction peak was submitted to smoothing and background-subtracting procedures, and then the integrated area thereof (referred to as "peak intensity hereinafter") was calculated. The evaluation results are shown in Table 2. The corrosion quantities set forth therein are relative values, with the peak intensity in the case of Comparative Example 5 being taken as 100.

Further, the hydrogen absorbing alloy compositions prepared above underwent the same life test as in Example 1. The results obtained are also shown in Table 2.

EXAMPLES 24 TO 27

To the same alloy powder as prepared in Example 1, the same ytterbium oxide used in Example 1 was added in a different proportion, from 0.005 to 30 weight %. The hydrogen absorbing alloy compositions thus obtained were tested by the same methods as in Example 1. The results obtained are shown in Table 3.

As can be seen from Tables shown below, the hydrogen absorbing alloy compositions according to the present invention were markedly reduced in quantity of hydroxides produced by the corrosion of the alloy surface, and successful in achieving considerably prolonged charge-and-discharge cycle life and great reduction in internal pressure of a secondary battery.

TABLE 1

| Sample | Compound added | Charge and discharge cycle life | Internal Pressure of battery (kg/cm$^2$) | Initial Capacity (mAh/g) |
| --- | --- | --- | --- | --- |
| Example 1 | $Yb_2O_3$ | 400 | 3.5 | 230 |
| Example 2 | $Er_2O_3$ | 450 | 3.0 | 220 |
| Example 3 | $Gd_2O_3$ | 360 | 4.0 | 210 |
| Example 4 | $Yb(OH)_3$ | 420 | 3.5 | 200 |
| Example 5 | $Er(OH)_3$ | 430 | 3.0 | 210 |
| Example 6 | Compound Oxide produced using $Yb_2O_3$ and $Lu_2O_3$ in the ratio of 1:1 by weight | 820 | 2.5 | 240 |
| Example 7 | Compound Oxide produced using $Yb_2O_3$ and $Er_2O_3$ in the ratio of 1:2 by weight | 859 | 2.5 | 235 |
| Example 8 | Compound Oxide produced using $Er_2O_3$ and $Dy_2O_3$ in the ratio of 1:1 by weight | 850 | 3.5 | 240 |
| Example 9 | Compound Oxide produced using $Er_2O_3$ and $HfO_2$ in the ratio of 1:1 by weight | 500 | 3.5 | 200 |
| Example 10 | Compound Oxide produced using $Er_2O_3$ and $Y_2O_3$ in the ratio of 9:1 by weight | 820 | 2.5 | 240 |
| Example 11 | Compound Oxide produced using $Yb_2O_3$ and $Er_2O_3$ in the ratio of 9:1 by weight | 650 | 2.5 | 200 |
| Example 12 | Compound Oxide produced using $Yb_2O_3$, $Sm_2O_3$ and $Gd_2O_3$ in the ratio of 8:1:1 by weight | 750 | 2.5 | 235 |
| Example 13 | Compound Oxide produced using $Yb_2O_3$, $Er_2O_3$ and $Yb_2O_3$ in the ratio of 7:2:1 by weight | 800 | 2.5 | 235 |
| Example 14 | Compound Oxide produced using $Y_2O_3$, $Er_2O_3$ and $Yb_2O_3$ in the ratio of 1:8:1 by weight | 650 | 3.0 | 230 |
| Example 15 | Compound Oxide produced using $Dy_2O_3$, $Er_2O_3$ and $Gd_2O_3$ in the ratio of 8:1:1 by weight | 650 | 3.5 | 240 |
| Example 16 | Compound Oxide produced using $Yb(OH)_3$ and $Lu(OH)_3$ in the ratio of 1:1 by weight | 750 | 2.5 | 240 |
| Example 17 | Compound Oxide produced using $Yb(OH)_3$ and $Er(OH)_3$ in the ratio of 1:2 by weight | 750 | 2.5 | 235 |
| Example 18 | Compound Oxide produced using $Er(OH)_3$ and $Dy(OH)_3$ in the ratio of 2:3 by weight | 500 | 3.5 | 240 |
| Comparative Example 1 | $La_2O_3$ | 250 | 12.5 | 235 |

TABLE 1-continued

| Sample | Compound added | Charge and discharge cycle life | Internal Pressure of battery (kg/cm²) | Initial Capacity (mAh/g) |
|---|---|---|---|---|
| Comparative Example 2 | not added | 250 | 12.5 | 235 |

TABLE 2

| Sample | Compound added | BET (m²/g) | RE purity (%) | corrosion quantity | Charge and discharge cycle life |
|---|---|---|---|---|---|
| Example 19 | Yb₂O₃ | 2.2 | — | 61 | 400 |
| Example 20 | Yb(OH)₃ | — | 35.3 | 57 | 420 |
| Example 21 | Yb₂O₃ | 5.5 | — | 85 | 350 |
| Example 22 | Yb₂O₃ | 13.5 | — | 72 | 300 |
| Example 23 | Yb(OH)₃ | — | 21.3 | 65 | 280 |
| Compar. Example 5 | not added | — | — | 100 | 250 |

RE stands for rare earth element.

TABLE 3

| Sample | Compound added | Amount added (Wt %) | Charge and discharge cycle life | Internal Pressure of battery (kg/cm²) | Initial Capacity (mAh/g) |
|---|---|---|---|---|---|
| Example 24 | Yb₂O₃ | 0.5 | 400 | 3.5 | 230 |
| Example 25 | Yb₂O₃ | 1.0 | 400 | 3.5 | 230 |
| Example 26 | Yb₂O₃ | 5.0 | 380 | 3.5 | 210 |
| Example 27 | Yb₂O₃ | 20.0 | 350 | 5.5 | 180 |
| Compar. Example 3 | Yb₂O₃ | 0.05 | 250 | 12.5 | 235 |
| Compar. Example 4 | Yb₂O₃ | 30.0 | 150 | 14.5 | 235 |

What is claimed is:

1. A hydrogen absorbing alloy composition which comprises;
   (1) 100 parts by weight of a $LnNi_5$ type hydrogen absorbing alloy, wherein Ln represents at least one rare earth element, and
   (2) 0.2 to 20 parts by weight of at least one rare-earth containing component selected from the group consisting of:
      oxides of heavy rare-earth elements Eu, Gd, Tb, Dy, Ho, Er, Tm, Yb and Lu;
      hydroxides of heavy rare-earth elements Eu, Gd, Tb, Dy, Ho, Er, Tm, Yb and Lu;
      compound oxides comprising at least two oxides of different metals including at least one rare-earth element; and
      compound hydroxides comprising at least two hydroxides of different metals including at least one rare-earth element.

2. A hydrogen absorbing alloy composition according to claim 1, wherein the rare-earth compound as the component (2) is at least one compound oxide or compound hydroxide which comprises at least one rare earth element selected from the group consisting of La, Ce, Pr, Nd, Y, Sm, Eu, Gd, Tb, Dy, Ho, Er, Tm, Yb and Lu.

3. A hydrogen absorbing alloy composition according to claim 1, wherein the rare-earth compound as the component (2) is at least one oxide represented by $R^1{}_2O_3$ or at least one hydroxide represented by $R^1(OH)_3$ wherein $R^1$ is a rare earth element selected from the group consisting of Eu, Gd, Tb, Dy, Ho, Er, Tm, Yb and Lu.

4. A hydrogen absorbing alloy composition according to claim 2, wherein the compound oxide is a compound represented by formula, $(R^2{}_2O_3)_a \cdot (R^3{}_2O_3)_b$ or $(R^2{}_2O_3)_c \cdot (R^3{}_2O_3)_d \cdot (R^4{}_2O_3)_e$, and the compound hydroxide is a compound represented by formula, $(R^2(OH)_3)_a \cdot (R^3(OH)_3)_b$ or $(R^2(OH)_3)_c \cdot (R^3(OH)_3)_d \cdot (R^4(OH)_3)_e$, wherein $R^2$, $R^3$ and $R^4$ are different from one another and each represents a rare earth element selected from the group consisting of La, Ce, Pr, Nd, Y, Sm, Eu, Gd, Tb, Dy, Ho, Er, Tm, Yb and Lu, a and b are each from 0.1 to 0.9 by mole, provided that a+b is 1 by mole, and c, d and e are each from 0.1 to 0.8 by mole, provided that c+d+e is 1 by mole.

5. A hydrogen absorbing alloy composition according to claim 3, wherein $R^1$ is a rare earth element selected from the group consisting of Yb, Er, Dy and Gd.

6. A hydrogen absorbing alloy composition according to claim 4, wherein the compound oxide is a compound selected from the group consisting of $(Yb_2O_3)_a \cdot (Lu_2O_3)_b$, $(Yb_2O_3)_a \cdot (Er_2O_3)_b$, $(Er_2O_3)_a \cdot (Dy_2O_3)_b$, $(Yb_2O_3)_c \cdot (Sm_2O_3)_d \cdot (Gd_2O_3)_e$ and $(Y_2O_3)_c \cdot (Er_2O_3)_d \cdot (Yb_2O_3)_e$, and the compound hydroxide is a compound selected from the group consisting of $(Yb(OH)_3)_a \cdot (Er(OH)_3)_b$ and $(Er(OH)_3)_a \cdot (Dy(OH)_3)_b$, wherein a and b are each from 0.1 to 0.9 by mole, provided that a+b is 1 by mole, and c, d and e are each from 0.1 to 0.8 by mole, provided that c+d+e is 1 by mole.

7. A hydrogen absorbing alloy composition according to claim 2, wherein the compound oxide is a compound represented by formula $R^5MO_m$ wherein $R^5$ is a rare earth element selected from the group consisting of Eu, Gd, Tb, Dy, Ho, Er, Tm, Yb, Lu and Y, M is a metal element except rare earth elements and m is a number of 2 to 6.

8. A hydrogen absorbing alloy composition according to claim 2, wherein the compound oxide is a compound selected from the group consisting of $Dy_2Hf_2O_7$, $Eu_2Hf_2O_7$, $Yb_2Zr_2O_7$, $Er_2Zr_2O_7$, $YAlO_4$, $YNbO_4$, $YVO_4$, $ErAlO_3$ and $Er_2Hf_2O_7$.

9. A hydrogen absorbing alloy composition according to claim 1, wherein the oxides are oxides having a specific surface area of 0.1 to 10 m²/g.

10. A hydrogen absorbing alloy composition according to claim 1, wherein the hydroxides are hydroxides whose rare-earth metals have a purity of at least 30 weight %.

11. A hydrogen absorbing alloy composition according to claim 1, wherein the LnNi$_5$ hydrogen absorbing alloy is a LaNi$_5$ type hydrogen absorbing alloy of formula, $$Ln(Ni_{(w-x-y-z)}Mn_xAl_yCo_z),$$

wherein Ln is La alone or a mixture of La and another rare earth element, $4.8 \leq w < 5.3$, $0 < x \leq 0.6$, $0 < y \leq 0.5$, and $0 < z \leq 1.0$.

12. A hydrogen absorbing alloy electrode for a nickel-hydrogen secondary battery, which comprises a hydrogen absorbing alloy composition according to claim 1 and a conductive support.

13. A hydrogen absorbing alloy electrode for a nickel-hydrogen secondary battery, which comprises a hydrogen absorbing alloy composition according to claim 2 and a conductive support.

14. A hydrogen absorbing alloy electrode for a nickel-hydrogen secondary battery, which comprises a hydrogen absorbing alloy composition according to claim 3 and a conductive support.

15. A hydrogen absorbing alloy electrode for a nickel-hydrogen secondary battery, which comprises a hydrogen absorbing alloy composition according to claim 4 and a conductive support.

16. A hydrogen absorbing alloy electrode for a nickel-hydrogen secondary battery, which comprises a hydrogen absorbing alloy composition according to claim 7 and a conductive support.

17. A composition comprising:
a LnNi$_5$ type hydrogen absorbing alloy, wherein Ln represents at least one rare-earth element, and
at least one rare-earth containing component selected from the group consisting of:
oxides of heavy rare-earth elements Eu, Gd, Tb, Dy, Ho, Er, Tm, Yb and Lu;
hydroxides of heavy rare-earth elements Eu, Gd, Tb, Dy, Ho, Er, Tm, Yb and Lu;
compound oxides comprising at least two oxides of different metals including at least one rare-earth element; and
compound hydroxides comprising at least two hydroxides of different metals including at least one rare-earth element.

18. A secondary battery having a hydrogen absorbing alloy composition comprising:
a LnNi$_5$ type hydrogen absorbing alloy, wherein Ln represents at least one rare-earth element, and
at least one rare-earth containing component selected from the group consisting of:
oxides of heavy rare-earth elements Eu, Gd, Tb, Dy, Ho, Er, Tm, Yb and Lu;
hydroxides of heavy rare-earth elements Eu, Gd, Tb, Dy, Ho, Er, Tm, Yb and Lu;
compound oxides comprising at least two oxides of different metals including at least one rare-earth element; and
compound hydroxides comprising at least two hydroxides of different metals including at least one rare-earth element.

19. A hydrogen absorbing alloy composition according to claim 17, wherein the compound oxide is a compound represented by the formula $$(R^2_2O_3)_a(R^3_2O_3)_b \text{ or } (R^2_2O_3)_c(R^3_2O_3)_d(R^4_2O_3)_e,$$

and the compound hydroxide is a compound represented by the formula $$(R^2(OH)_3)_a(R^3(OH)_3)_b \text{ or } (R^2(OH)_3)_c(R^3(OH)_3)_d(R^4(OH)_3)_e,$$

wherein R$^2$, R$^3$ and R$^4$ are different from one another and each represents a rare-earth element selected from the group consisting of La, Ce, Pr, Nd, Y, Sm, Eu, Gd, Tb, Dy, Ho, Er, Tm, Yb and Lu, a and b are each from 0.1 to 0.9 by mole, provided that a+b is 1 by mole, and c, d and e are each from 0.1 to 0.8 by mole, provided that c+d+e is 1 by mole.

20. The secondary battery having a hydrogen absorbing alloy composition according to claim 18, wherein the compound oxide is a compound represented by the formula $$(R^2_2O_3)_a(R^3_2O_3)_b \text{ or } (R^2_2O_3)_c(R^3_2O_3)_d(R^4_2O_3)_e,$$

and the compound hydroxide is a compound represented by the formula $$(R^2(OH)_3)_a(R^3(OH)_3)_b \text{ or } (R^2(OH)_3)_c(R^3(OH)_3)_d(R^4(OH)_3)_e,$$

wherein R$^2$, R$^3$ and R$^4$ are different from one another and each represents a rare-earth element selected from the group consisting of La, Ce, Pr, Nd, Y, Sm, Eu, Gd, Tb, Dy, Ho, Er, Tm, Yb and Lu, a and b are each from 0.1 to 0.9 by mole, provided that a+b is 1 by mole, and c, d and e are each from 0.1 to 0.8 by mole, provided that c+d+e is 1 by mole.

* * * * *